United States Patent [19]

Martin et al.

[11] Patent Number: 5,020,129
[45] Date of Patent: May 28, 1991

[54] ADDRESSABLE CONTROL SYSTEM FOR CATV PROGRAM DISTRIBUTION

[75] Inventors: Thomas F. Martin, Richardson; John S. Chenoweth, Denton; Paul R. Tinguely, Bedford, all of Tex.

[73] Assignee: General Instrument Corporation, New York, N.Y.

[21] Appl. No.: 510,287

[22] Filed: Apr. 16, 1990

[51] Int. Cl.$^5$ .................... H04H 1/02; H04N 7/16
[52] U.S. Cl. ........................................ 455/4; 455/6; 455/186; 358/86
[58] Field of Search ........................................ 455/3–6, 455/32, 70, 175, 185, 186; 358/86; 380/20

[56] References Cited

U.S. PATENT DOCUMENTS

| | | |
|---|---|---|
| 4,039,954 | 8/1977 | den Toonder . |
| 4,349,795 | 9/1982 | Kwok .................... 333/176 |
| 4,367,557 | 1/1983 | Stern et al. . |
| 4,369,443 | 1/1983 | Giallanaza et al. ............ 340/825.47 |
| 4,527,194 | 7/1985 | Sirazi . |
| 4,677,685 | 6/1987 | Kurisu ..................... 455/4 |
| 4,710,956 | 12/1987 | Rast . |
| 4,807,023 | 2/1989 | Bestler et al. ............. 358/86 |
| 4,810,898 | 3/1989 | Rocci et al. ............. 307/115 |
| 4,890,321 | 12/1989 | Seth-Smith et al. ................. 380/20 |

Primary Examiner—Reinhard J. Eisenzopf
Assistant Examiner—Chi H. Pham
Attorney, Agent, or Firm—Barry R. Lipsitz

[57] ABSTRACT

Remote control of subscriber access to premium programs on a cable television system or the like is provided. A signal path carriers program signals received from a cable television system. A switchable port coupled to the signal path is identified by a logical channel number. First data are received and stored from the cable television system assigning a service code to the logical channel. Second data are received and stored from the cable television system identifying authorized service codes. The assigned logical channel service code is periodically compared to the stored authorized service codes to determine if the logical channel is authorized. The port is switched to provide or deny access to a program signal carried on the signal path, depending on whether the service code assigned to the logical channel identifying the port is authorized. A plurality of ports can be provided to enable subscriber access to different premium services. Each port can couple a trap to the signal path, alternately bypass the trap, or alternately open the signal path to disconnect a subscriber.

39 Claims, 7 Drawing Sheets

ADDRESSABLE CONTROL SYSTEM FOR CATV PROGRAM DISTRIBUTION

BACKGROUND OF THE INVENTION

The present invention relates to the selective distribution of cable television ("CATV") signals or the like to subscribers, and more particularly to a method and apparatus for remotely supplying or denying subscriber access to cable services such as television programs, movies, and special events.

In cable television networks, subscribers are connected with the aid of signal distribution devices to a transmission line carrying television programs, radio programs, and associated data.

A disadvantage with conventional cable television systems is that only subscribers who indicate that they want to receive cable television services are connected to the distribution system. Installation of new subscribers requires a technician to travel to the subscriber's residence to connect the cable. Upon a termination of service, a technician has to travel again to the residence to disconnect the subscriber from the distribution network.

Certain programs transmitted over the cable television network are premium programs that the subscriber must pay an additional fee to receive. In the past, subscribers have been authorized to receive such programs in various ways. In some systems, a technician must travel to the subscriber's residence to install or remove traps (i.e., signal filters) or descramblers in the subscriber drop. In other systems, addressable converter/descramblers are provided to the subscribers. A cable system operator can authorize or deauthorize the receipt of programs by transmitting control signals to each subscriber's addressable descrambler. Although this technique has been very successful, the converter/descramblers that must be provided to each subscriber are somewhat expensive.

The converter/descramblers used in prior art systems include tuners to enable the subscriber to select a channel to be viewed. Certain program specific "tag data" is transmitted on the sound carrier of the program signal as AM data. This requires a separate AM data receiver to be provided in the converter/descrambler to receive the channel tagging data. An example of such a prior art system can be found in the Impulse 7000 Series Addressable Converters available from the Jerrold Division of General Instrument Corporation, Hatboro, Pennsylvania.

In some cable television systems, a multiple system operator ("MSO") provides signals to a number of different local cable system operators ("CSO"). The CSO's each serve subscribers in a different geographic area, and typically provide their subscribers with different subsets of the full set of services available from the MSO. Often, a single service provided by an MSO will be found on different channels in each of the local systems. Thus, for example, the "Home Box Office" movie service may be provided on channel 2 by one CSO and on channel 8 by another CSO. An MSO who desires to keep track of the various services provided to different subscribers on different channels, e.g., for accounting and/or authorization purposes, has a complicated task. The process becomes more complicated in a system that offers dynamic events, such as pay-per-view programs. In such systems, an MSO or CSO must keep track of which subscribers have ordered what events, when the events are to be broadcast, the channels on which the events are to be broadcast, and the authorization protocols that will enable authorized subscribers to receive the programs.

It would be advantageous to provide a relatively inexpensive signal distribution device that could be remotely controlled from a cable television headend to enable or disable the reception of particular cable television channels by individual subscribers. It would be particularly advantageous to provide such a distribution device that does not require a tuner to tune to specific channels, and yet permits an MSO to control access to programming regardless of the difference in physical channel assignments and specific distribution wiring used by individual CSO's and provided to individual subscribers. It would be further advantageous to provide such apparatus with a limited number of signal ports or "access devices" for distribution of premium programs to individual subscribers, without thereby limiting the number of premium services offered by the MSO system wide.

It would also be advantageous to provide a signal distribution device that can be economically installed at each residence in a neighborhood during the original installation of a cable television system. Such a device should enable a cable system operator to selectively couple and decouple a plurality of signal traps or other access devices in series with a subscriber drop to enable and disable the reception of designated program channels, without allowing subscribers or others to switch the access devices themselves.

It would be further advantageous to provide the distribution device with a remotely controlled on/off position, wherein cable television signals carried on the transmission line can be blocked from entering residences of those who are not subscribers. Such an on/off position would enable a cable operator to remotely disconnect terminated subscribers, and connect new subscribers.

The present invention relates to distribution apparatus and a signal distribution method having the above-mentioned and other advantages. More specifically, a novel "logical channel" construct is disclosed wherein access devices on a subscriber distribution device are assigned logical channel numbers. The access devices are switched to provide or deny subscriber access to particular services based on service codes associated with the logical channels and service code authorization data. The service code to logical channel associations and the authorization data may be downloaded to the distribution device from a headend, and may be altered by a system operator periodically or on a real-time basis as services and subscriptions change.

SUMMARY OF THE INVENTION

In accordance with the present invention, cable television apparatus is provided for supplying or denying subscriber access to cable services. A signal path carries program signals received from a cable television system. A switchable port or other access device coupled to the signal path is identified by a logical channel number. Means are provided for receiving and storing first data from the cable television system assigning a service code to the logical channel. Means are provided for receiving and storing second data from the cable television system identifying authorized service codes. The service code assigned to the logical channel is periodically compared to the stored authorized service codes to determine if the logical channel is authorized. Means responsive to the comparing means actuates the access device to provide or deny access to a program signal carried on the signal path, depending on whether the service code assigned to the logical channel identifying the access device is authorized.

In a preferred embodiment, a plurality of access devices, each identified by a different logical channel number, are provided. Each access device is actuated to provide or deny access to a program signal in response to determinations made by the comparing means based on service codes assigned to the logical channels for the access devices. The access devices may comprise traps that are selectively coupled in series along the signal path, and include means responsive to the actuating means for coupling a trap to the signal path or for alternately bypassing the trap. Means responsive to a disconnect signal may be provided for alternately opening the signal path to prevent the transmission of all program signals thereon.

It is possible to use different polarity traps at the ports. Therefore, means are provided for storing data indicative of the trap polarity, wherein the actuation means is responsive to the polarity data and the comparing means to couple or decouple the trap from the signal path.

The first data receiving and storing means can periodically receive and store updated service code assignment data. Similarly, the second data receiving and storing means can periodically receive and store updated service code authorization data, to enable services to individual subscribers to be changed. The first data comprises "tagging data" that is transmitted together with the second data on a global basis over an FM data path instead of as AM data on the sound carrier of a specific television channel. Therefore, it is not necessary to correlate tagging data to a particular television channel, and the data is retrievable without tuning to a particular television channel.

The present invention also provides addressable apparatus for switching access devices such as traps in and out of a cable television subscriber drop in response to data received from a headend. A signal path carries program signals received from a cable television transmission line. A computer processor is coupled to receive data from the transmission line. Means are provided for selectively coupling traps to the signal path at corresponding ports identified by logical channel numbers. In a preferred embodiment, the trap coupling means comprises, for each port, a solid-state double pole double throw switch with a separate off position. Memory means coupled to the computer processor stores tagging data received from the transmission line correlating each logical channel to a service code. The tagging data is received on an FM data path and is not specific to a particular television channel. Data received over the FM data path identifying authorized service codes is also stored. Means responsive to the computer processor periodically tests the service code corresponding to each logical channel to determine if it is an authorized service code. Means responsive to the testing means actuates the trap coupling means to couple or decouple traps at said ports, depending on whether the service codes associated with the logical channels identifying the ports are authorized. The service code authorization data and logical channel to service code correlation data may be received by the computer processor via an FM data receiver coupled between the transmission line and the processor. The computer processor may be programmed to respond to a particular address, enabling different data (e.g., service code authorizations) to be selectively transmitted to each different subscriber location.

A cable television signal distribution system or the like in accordance with the present invention provides remote authorization of subscriber access to signals. The distribution system includes a headend coupled to transmit signals on a signal distribution line. A subscriber drop is coupled to receive signals from the distribution line. A signal authorization apparatus having a signal path coupled in series with the subscriber drop includes an actuable access device coupled to the signal path and identified by a logical channel number. Data is received from the headend identifying a service code to be associated with the logical channel and identifying an authorized service code. The service code associated with the logical channel is compared to the authorized service code, and the access device is actuated to provide or deny access to a signal carried on the signal path depending on whether the service code associated with the logical channel identifying the access device is authorized. The signal authorization apparatus can comprise a plurality of such access devices, each identified by a different logical channel number for providing or denying access to different signals carried on the signal path. The access devices can be actuated to open the signal path in response to a disconnect signal received from the headend, to prevent communication of signals from the signal distribution line to an individual who is not a subscriber. Conversely, the access devices can be actuated to close the signal path in response to a connect signal, thereby remotely initiating or restoring service to a subscriber.

A method in accordance with the present invention controls subscriber access to signals carried on a signal distribution line. Received signals are coupled to an access device identified by a logical channel number. A service code is assigned to the logical channel. Data received from the distribution line identifies an authorized service code. If the authorized service code matches the assigned service code, the access device identified by the logical channel number is actuated to provide access to a received signal corresponding to the assigned service code. Otherwise, the access device denies access to the signal.

DETAILED DESCRIPTION OF THE INVENTION

Figure 1:
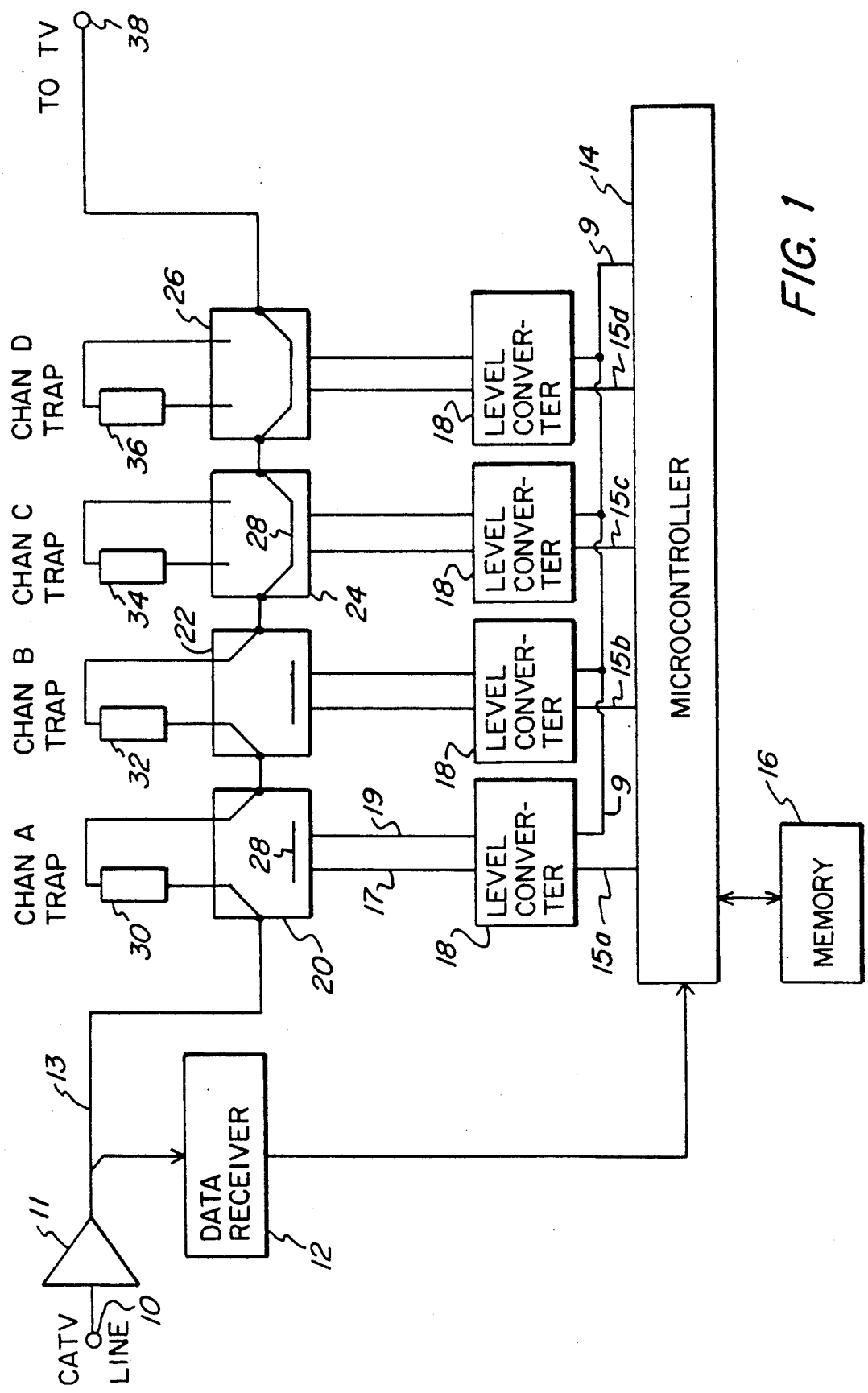
FIG. 1 is a block diagram of a cable television distribution device in accordance with the present invention.

The present invention allows subscriber access to program signals in a cable television system or the like to be remotely controlled by a system operator. A variety of signals are sent over the distribution network, and coupled via subscriber drops to individual subscribers. An addressable distribution device is coupled in series with each subscriber drop to control access to individual program signals. The distribution device may switch signal traps (filters) in or out of the subscriber drop to permit or deny reception of signals to which the traps are tuned. Those skilled in the art will appreciate that other access/denial circuits may be substituted for fixed frequency traps. The term "access device" is used herein to refer to any mechanism that can selectively provide or deny access to a particular CATV signal.

In accordance with one embodiment of the present invention, traps or other access/denial mechanisms are switched at ports provided in the addressable distribution device. The addressable distribution device may only have a limited number of ports, e.g., four. Many cable systems (or collections of systems controlled by an MSO) offer more than four pay services. For example, system A might offer Pay 1, Pay 4, Pay 5 and Pay 8 while system B offers Pay 3, Pay 6 and Pay 8. This represents a total of six different pay services. It is therefore necessary for the MSO of systems A and B to control all six services, even though each distribution device has only four ports in the present example.

In order to provide the MSO control of all six services, each port is assigned an arbitrary logical channel number by loading the distribution device with a map relating each port to a logical channel. This map could be the same for all distribution devices within a system (example system A above, where port 1 would be Logical Channel 1, Port 2 Logical Channel 4, Port 3 Logical Channel 5, and Port 4 Logical Channel 8) if that system offered four or fewer pays from the larger MSO menu of, for example, six pay services.

Alternatively, if a given system offered more than four pay services but each distribution device had only four ports, each distribution device could be given a map relating its ports to those four channels most likely to be ordered by a subscriber. This would make addressable those pay channels each subscriber would most likely subscribe to, at the expense of adding complexity to record keeping, since different subscribers would have some addressable (on a port) and some non-addressable pay services.

The distribution device of the present invention cannot tune to specific channels. Therefore, there is no access to channel specific tagging data. Such data is required to indicate what "service code" is associated with each channel at any instant in time. Tagging data can be constant (e.g., the HBO service always has the same service code) or can change with time (e.g., pay-per-view services). To enable the distribution devices to obtain tagging data without tuning to specific channels as in the prior art, a map relating service codes to logical channels is generated at the "headend" for all controlled channels. This map can be globally transmitted periodically along with individually addressed service code authorization data, which tells each distribution device which service codes it is to authorize. A preferred embodiment transmits the global map and individual authorizations as FM data on a single frequency, for reception by a common receiver.

The distribution device of the present invention then does a port-by-port comparison of previously authorized service codes with those service codes in the service code to logical channel map at any given moment. If there is a service code match, the corresponding logical channel is authorized by switching the appropriate port (known from the port to logical channel map) either to bypass a negative trap or pass through a positive trap.

In this manner, a system wide data stream from a multiple system operator can be used to control access to individual program signals without regard to physical channel assignments or differences in filter port locations among individual distribution systems and individual subscribers. Where a local system operator (CSO) is involved, control of program distribution is available without the need for the MSO to account for or keep track of differences in channel frequencies, trap frequencies, or filter port locations. Thus, maximum operational flexibility is provided, which is particularly useful in controlling a plurality of distribution systems (e.g., local CATV systems) from a single addressable control center.

FIG. 1 illustrates a distribution device used in accordance with the present invention for switching traps in or out of a circuit. The circuit may comprise, for example, a cable television subscriber drop. In a cable television application, the traps may be either "positive" or "negative". A positive trap is a filter that removes an interfering carrier to authorize a cable television service. A negative trap is a filter used to remove a nonauthorized service. It should be appreciated that any other type of access device may be substituted for the switchable traps illustrated.

Control signals for the device are sent on a out-of-band data carrier from a cable television headend to the subscriber distribution device. The transmission of out-of-band control signals is well known in the art. In existing systems using addressable converter/descramblers, the control signals are typically sent as FM data. Where signals pertain only to a particular television program, they are sent as AM tag data in the sound for transmitting and receiving data signals over a cable television system is described, for example, in commonly assigned U.S. Pat. No. 4,710,955 to Kauffman, entitled "Cable Television System with Two-Way Telephone Communication Path". Unlike such prior art systems, the tagging data in the present system is not specific to a particular television channel. The provision of tagging data that is not channel specific provides substantial flexibility in the system of the present invention and enables access to cable television services to be controlled regardless of differences in physical channel assignments and differences in filter port locations among local cable systems and individual subscribers, as explained in more detail below.

In the apparatus illustrated in FIG. 1, signals transmitted on a cable television transmission line are received at terminal 10 and input to a conventional RF amplifier 11. The amplified signal is received by data receiver 12 which is an FM receiver for detecting digital data carried on the cable television network. Both individually addressed and global messages may be sent as data over the cable television network. These messages are coupled from data receiver 12 to a microcontroller 14 where they are decoded and acted upon to control the state of a plurality of RF switches 20, 22, 24, 26. Microcontroller 14 will decode and act on all global messages it receives. When individually addressed messages are received, microcontroller 14 will only respond to those specifically addressed to it. A nonvolatile memory 16 is coupled to microcontroller 14 and stores an address for the particular subscriber unit together with an authorization bit map indicative of the cable services the subscriber is authorized to receive. RF switches 20, 22, 24, 26 will be actuated in accordance with the authorization data to permit reception of authorized services and block reception of nonauthorized services.

Each RF switch operates in a double pole double throw (DPDT) configuration, with an appropriate trap connected in one leg of the switch. One path of each switch is routed to pass the received cable signals to and from the trap. When positive traps are used, this path will be selected when a channel to which the trap corresponds is authorized. When negative traps are used, this path is selected when a channel to which the trap corresponds is not authorized for reception. Traps 30, 32, 34 and 36 are illustrated for use with RF switches 20, 22, 24, 26, respectively. Those skilled in the art will appreciate that a plurality of traps can be connected in series and coupled to a single RF switch to provide "tiered" services, e.g., authorization of two or more channels that are sold as a package. In such an embodiment, a single service code will serve to authorize the set of tiered channels associated with a switch.

The other path in each switch is a through connection, illustrated by reference numeral 28. The through connection 28 is selected for positive trap configurations when a signal is not authorized for reception. Through connection 28 is selected for negative trap configurations when the trap corresponds to an authorized channel.

In the example shown in FIG. 1, traps 30 and 32 for channel A and channel B, respectively, are coupled in series with the cable television signal path 13. Traps 34 and 36 for channels C and D, respectively, are not coupled to the cable television signal path. Instead, switches 24 and 26 are shown in their through connection mode. Thus, where the traps illustrated in FIG. 1 are positive traps, channels A and B will be available for viewing on a television coupled to terminal 38, and channels C and D will not be available.

Control signals for actuating switches 20, 22, 24, 26 are provided by microcontroller 14 via level converters 18. Each level converter 18 receives digital data on a respective control line 15a-15d from microcontroller 14 indicating whether the associated switch should be set to a first actuated position connecting the corresponding trap to the signal path or to a second actuated position providing through connection 28 in series with the signal path. Digital data output from microcontroller 14 on a common disconnect line 9 is used to set the switches to an off position providing an open circuit along the signal path. In the off position, neither of the poles of the DPDT switch are coupled to the corresponding trap or through connection.

Figure 2:
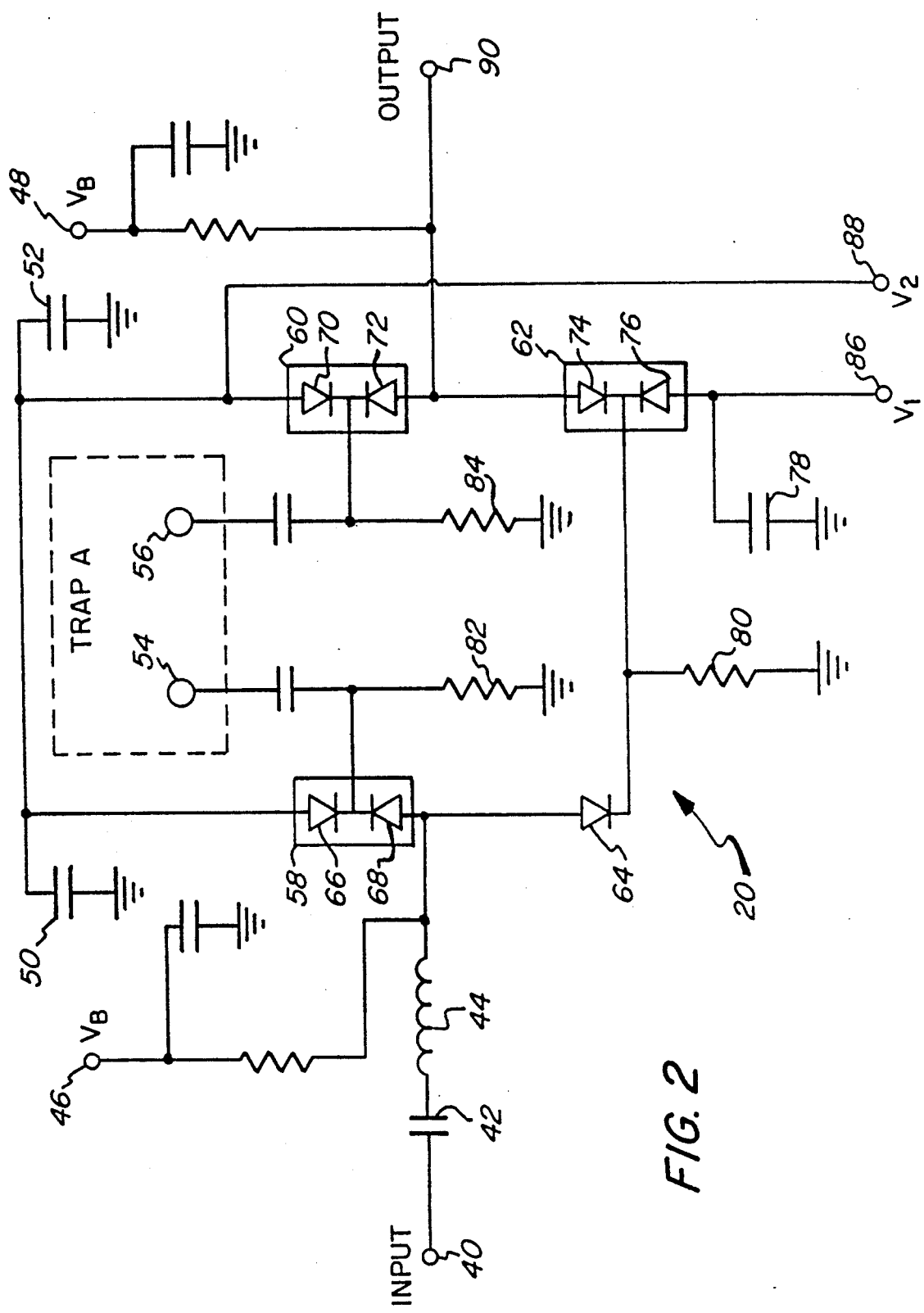
FIG. 2 is a schematic diagram of a solid-state RF switch that may be used in accordance with the present invention.

FIG. 2 is a schematic diagram illustrating a solid-state RF switch that may be used in connection with the present invention. Those skilled in the art will appreciate that other types of switches may be substituted for the solid-state switch illustrated in FIG. 2.

In the switch illustrated in FIG. 2, incoming signals are coupled to input terminal 40, filtered at capacitor 42 and choke 44, and applied to a plurality of diodes. A first pair of diodes 58 and a second diode pair 60 form a first RF signal path in series with terminals 54, 56 to which a series trap can be coupled. In a preferred embodiment, the series trap is a fixed frequency filter for allowing or blocking reception of cable television channels. Such traps are well known in the art, and are typically fabricated from various capacitive, resistive, and inductive elements.

Diode pair 58 comprises back-to-back diodes 66, 68 coupled at their cathodes. Similarly, diode pair 60 comprises back-to-back diodes 70, 72 coupled at their cathodes. The common cathodes of diode pair 58 are coupled through biasing resistor 82 to ground. The common cathodes of diode pair 60 are coupled to ground through biasing resistor 84. Diodes 68 and 72 are coupled as series diodes in the first signal path. Diodes 66 and 70 are coupled as shunt diodes in the first signal path. Shunt diodes 66, 70 are coupled to ground through shunt capacitors 50, 52, respectively.

A second signal path is formed by diode pair 62 and an additional diode 64. Diode pair 62 comprises back-to-back diodes 74, 76 sharing common cathodes. The cathodes of all of the diodes in the second signal path are coupled to ground through biasing resistor 80. Diode 74 of diode pair 62 is connected as a series diode within the second signal path. Diode 76 is coupled to ground through capacitor 78 to provide an RF shunt.

The various diodes in the circuit are biased by a combination of three DC bias signals $V_1$, $V_2$, and $V_B$ having the same polarity and different magnitudes. When it is intended to have a signal input at terminal 40 pass through the trap, diodes 64, 66, 70 and 74 are biased so that they are off. Diodes 68, 72 and 76 are biased so that they are turned on. This is accomplished by providing a positive DC voltage $V_1$ at terminal 86 that is greater in magnitude than a DC voltage $V_2$ applied to terminal 88. The magnitude of bias voltage $V_B$ is between $V_1$ and $V_2$. With this combination of applied bias voltages, an RF signal input at terminal 40 passes through diode 68 to terminal 54, proceeds through a trap coupled between terminals 54 and 56, and on through diode 72 to output terminal 90. Propagation of the RF signal through the second signal path is blocked by diodes 62 and 64, which are turned off.

The RF switch of FIG. 2 can be biased to block the first signal path and pass RF signals on the second signal path by providing voltage $V_1$ at a lower magnitude than voltage $V_2$, with voltage $V_B$ between $V_1$ and $V_2$. This mode of operation provides a through connection between input terminal 40 and output terminal 90, bypassing the trap.

The switch can also be biased to open circuit the signal path between input terminal 40 and output terminal 90, by applying identical positive DC voltage signals at both terminals 86 and 88, with a positive DC bias signal $V_B$ of lower magnitude at terminals 46 and 48.

The solid-state switch of FIG. 2 is described in greater detail in commonly assigned, concurrently filed co-pending U.S. patent application Ser. No. 07/510,289, entitled "Signal Switching Apparatus" and incorporated herein by reference.

Figure 3:
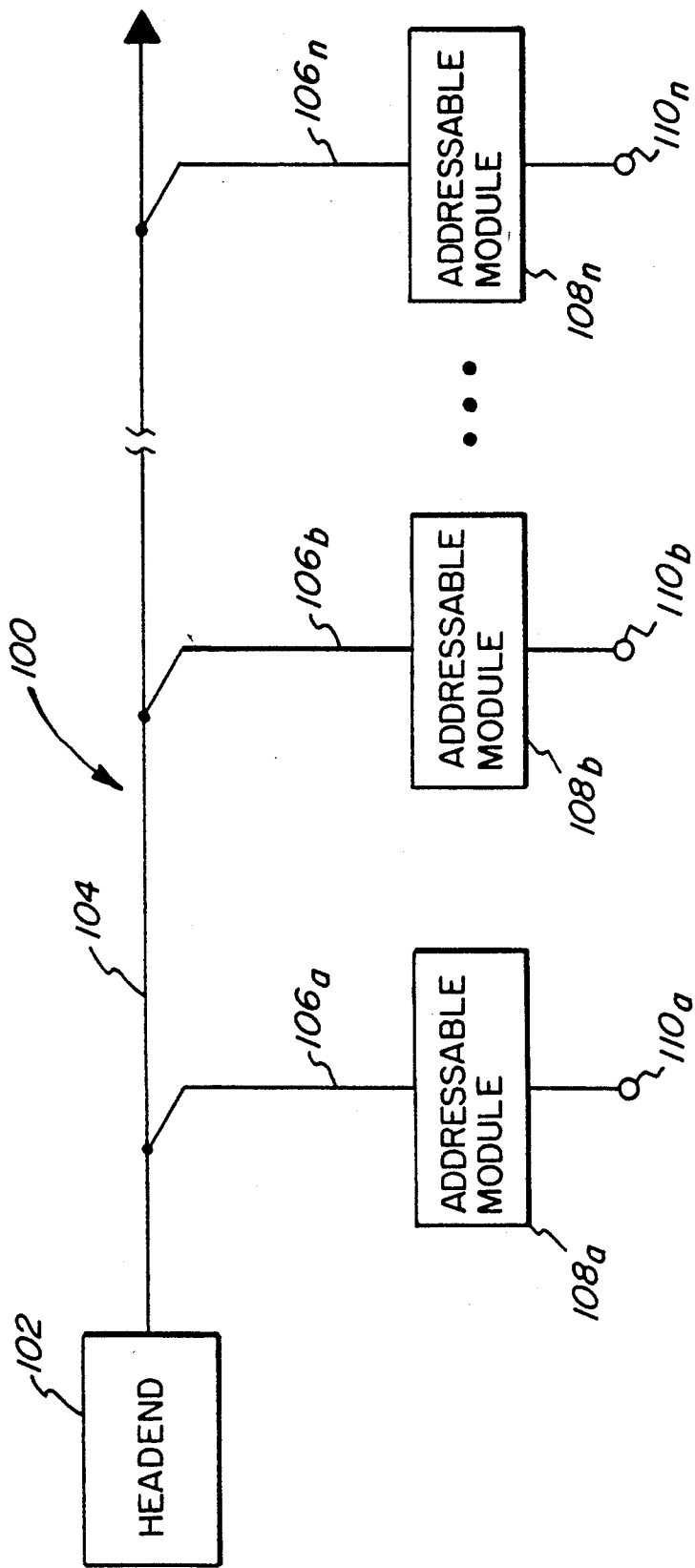
FIG. 3 is a block diagram of a signal distribution system in accordance with the present invention.

Turning now to FIG. 3, a signal distribution system 100 is illustrated for providing remote authorization of subscriber access to signals. A headend 102 is coupled to transmit signals on a signal distribution line 104. A plurality of subscriber drops 106a, 106b, . . . 106n are coupled to receive signals from the distribution line. In a preferred embodiment, the distribution line 104 carries cable television signals from cable television headend 102.

An addressable module 108a, 108b, ... 108n is coupled to each subscriber drop and comprises signal authorization apparatus that is remotely controlled by headend 102 via signals carried on the signal distribution line 104 and corresponding subscriber drops 106a, 106b, ... 106n.

In a preferred embodiment, each addressable module contains the various components illustrated in FIG. 1. In particular, a signal path is coupled in series with the subscriber drop. A plurality of switchable ports are coupled to the signal path, each identified by a different logical channel number. Data is received from headend 102 identifying service codes to be associated with each logical channel, and identifying authorized service codes. The service code to logical channel data and the authorization data are stored in memory, such as memory 16 illustrated in FIG. 1. A comparison is made (e.g., by microcontroller 14) of the service code associated with each logical channel and the authorized service codes. The ports are then switched to provide or deny access to signals carried on the signal path, depending on whether the service code associated with the logical channel identifying a port is an authorized service code.

The addressable modules provided in accordance with the present invention may be designed to coexist with addressable converter/descramblers (e.g., Impulse 7000 Series components provided by the Jerrold Division of General Instrument Corporation) in existing cable television systems. However, the addressable module of the present invention differs from existing converter/descramblers in many significant ways. For example, the addressable module has no knowledge of channels tuned by a subscriber, and has no ability to substitute special channels such as a barker channel in lieu of a selected channel. In a preferred embodiment, the addressable module does not read any tagging data from any of the controlled channels. In addition, the addressable module provides only on/off control signals to ports for connecting traps or other supply/deny mechanisms, which may be associated with any channel. The cable television signals may be transmitted in a "clear", unscrambled mode wherein access is controlled merely by the presence or absence of traps in the subscriber drop.

As previously explained in connection with FIG. 1, each addressable module contains a unique address that may be assigned in a well known manner. For example, the module's serial number may be downloaded during manufacture as FM data received by data receiver 12 (FIG. 1) and stored in nonvolatile memory 16. Subsequently, a serial number to logical address command is transmitted to the module. The module is then addressed by means of the logical address. By retaining the serial number in nonvolatile memory, it can be used to reassign the logical address for security reasons as well known in the art. The unit will also be initialized with data indicative of the module's configuration (e.g., time-out parameters), logical channel to port assignments, service code to logical channel assignments, and a set of initial and/or default service code authorizations. Initialization of this data can be done at the time of manufacture, at the cable operator's facilities, or on site at a subscriber location via a portable terminal.

Figure 6A:
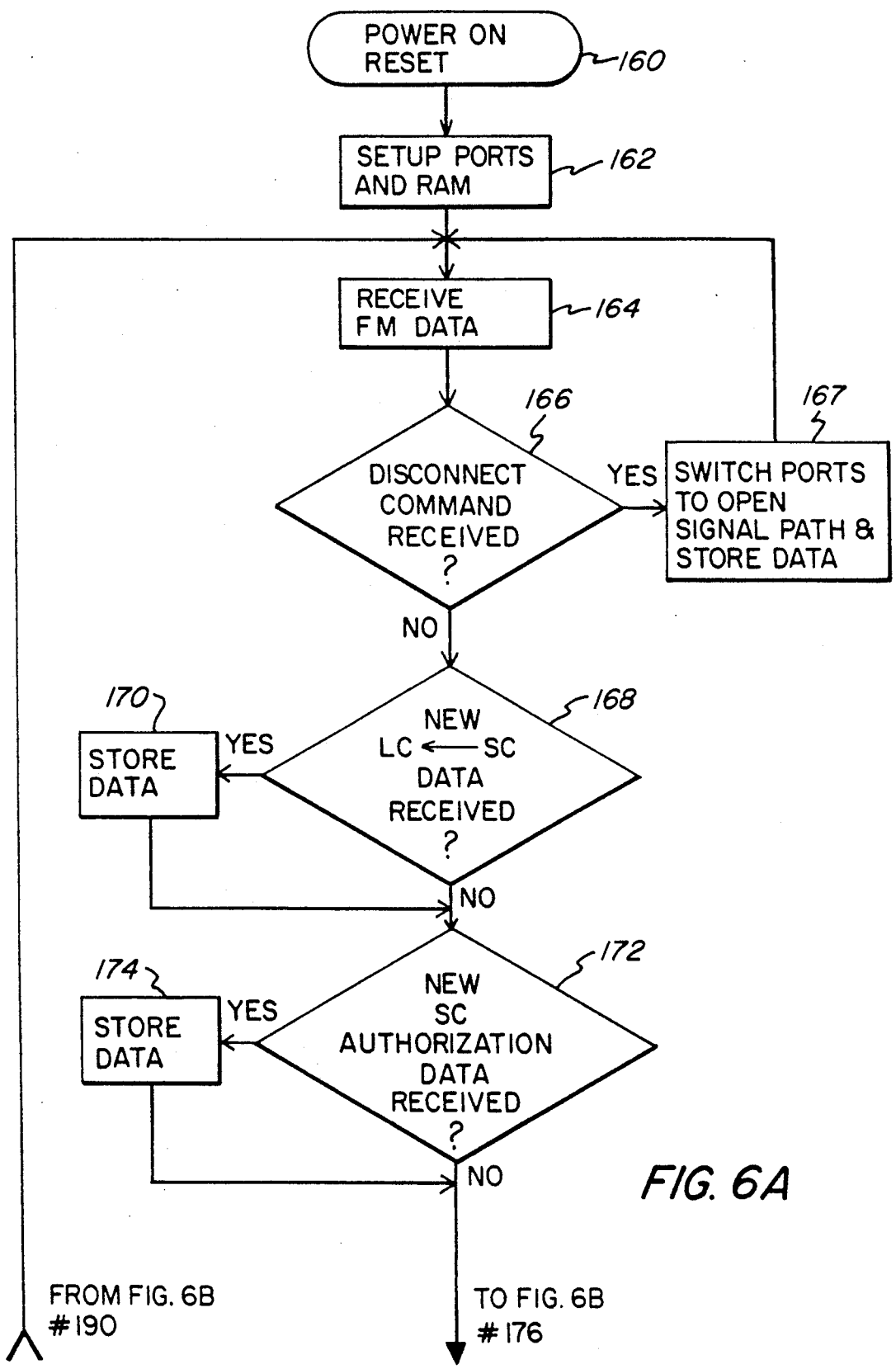
FIGS. 6A and 6B contain a flow chart illustrating a routine for evaluating and switching ports to provide or deny access to signals.
Figure 6B:
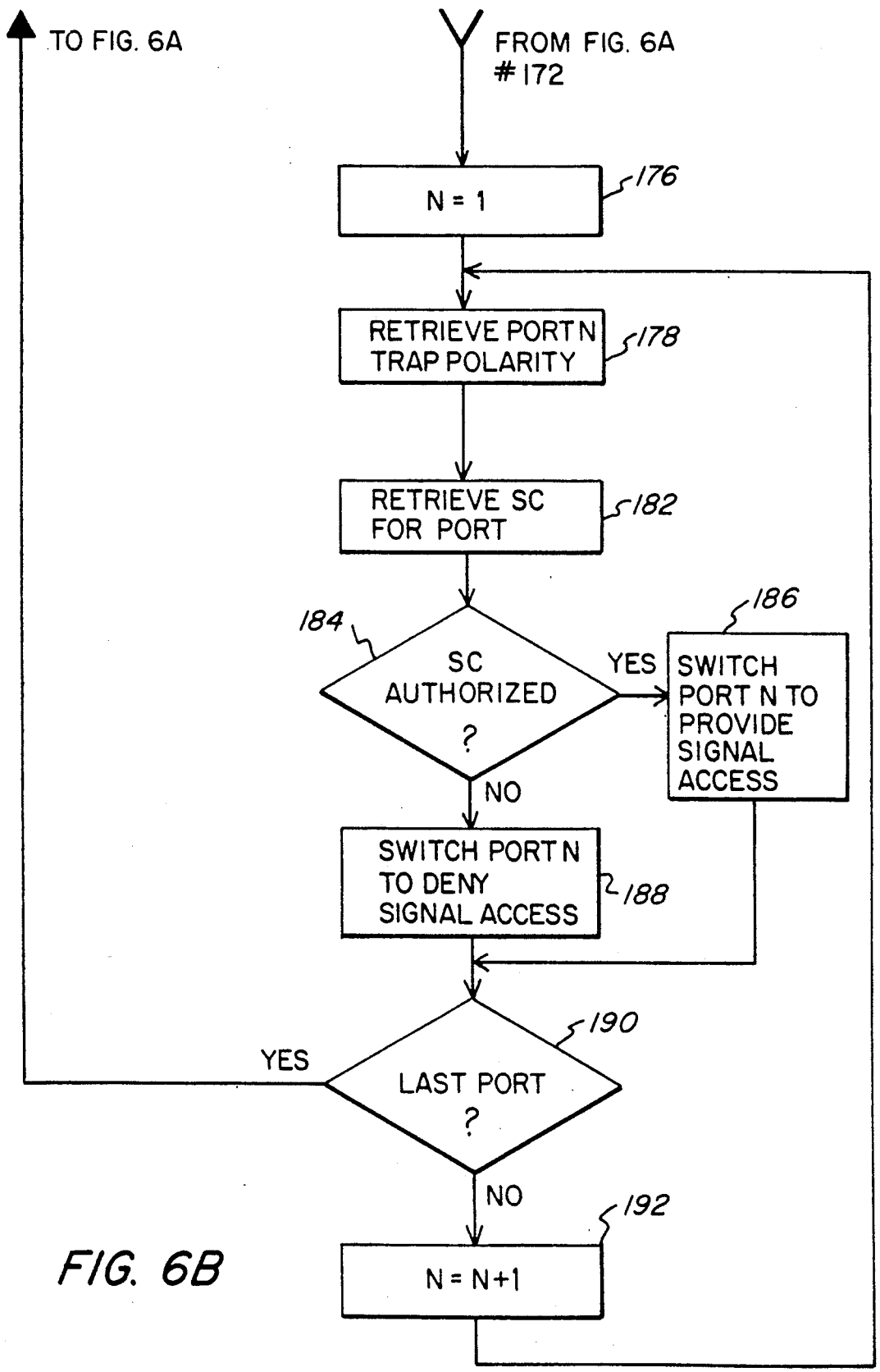

An example of a software routine that can be used to control the switching of ports in the addressable module is illustrated in the combination of FIGS. 6A and 6B. The software is executed by microcontroller 14. The routine begins at box 160 when the module is powered on. Control then passes to box 162 where the random access memory ("RAM") in microcontroller 14 is loaded with the data stored in nonvolatile memory 16, and the ports are reset to their proper positions according to the last authorization data stored in the module. Reinitialization of the module with its serial number, identification and trap polarities is accomplished using standard techniques. Resetting of the ports can be accomplished by executing the loop illustrated in FIG. 6 at boxes 176-192, as described below.

After the module has been reset, control passes to box 164 where new FM data from the headend is received via an interrupt routine in a manner well known in the art. In a preferred embodiment, the interrupt service routine chosen will do low-level deserializing of the incoming data, and set a command process flag once a complete command is received.

At box 166, a determination is made as to whether a disconnect command has been received from the headend. If a disconnect signal is received, control passes to box 167, and all of the ports (i.e., switches 20, 22, 24, 26) are switched to their off positions by microcontroller 14 and level converters 18, to open the signal path between input terminal 10 and output terminal 38. At the same time, data is stored indicating that a disconnect command was received, so that the module will remain disconnected should power be turned off and then on again. The module will thereby remain disconnected until a later reconnect command is received at box 164.

In order to provide security, the addressable module will time out if it does not receive a valid FM data command to its address within a given time period. The provision of such a time out feature is well known in the art, and is not illustrated in the routine of FIG. 6. Microcontroller 14 can be configured to provide either of two results if the addressable module times out. The first option is to deauthorize all ports and thereby deny subscriber access to all premium programs. In this event, basic services transmitted by the headend would still be available to the subscriber. The other option upon a time out is for microcontroller 14 to terminate all service to the subscriber by switching each port to the off position, resulting in an open circuit in the subscriber drop.

If the addressable module does not time out and a disconnect signal is not received, control passes from box 166 in FIG. 6 to box 168 where a determination is made as to whether new data is being received from the headend assigning service codes to logical channels. If such data is being received, control passes to box 170 where the data is stored. In a preferred embodiment, each service code is stored with reference to the port corresponding to its associated logical channel, to avoid the need to retrieve the cross-reference between the logical channel and port during subsequent processing. Then, at box 172 a determination is made as to whether new service code authorization data is being transmitted by the headend. If so, the data is received and stored as indicated at box 174. Then, at box 176 the routine commences to evaluate which ports to authorize. It does this on a port-by-port basis.

To evaluate a port, the service code corresponding to each port is determined from information stored in memory. The corresponding service code bit in an authorization map containing the service code authorization data is checked to determine if the addressable module is authorized for the service, or not. The corresponding port is then set to the proper state. The proper state is determined via a polarity map which determines whether the authorized state for the port is the trapped path or the bypass path depending on the type of trap in use (i.e., a positive trap or a negative trap).

As indicated at box 176, a counter N is set to 1. Control then passes to box 178 where the polarity of the trap coupled to port N is retrieved. The service code for the port is retrieved at box 182. Then, at box 184, a determination is made as to whether the service code is authorized. If so, port N is switched to provide access to the signal corresponding to the service code as indicated at box 186. Otherwise, control passes from box 184 to box 188 where port N is switched to deny access to the nonauthorized signal. At box 190, a determination is made as to whether the last port has been evaluated. If not, the counter N is incremented to N+1 and control passes back to box 178. In this manner, each port is evaluated one at a time. When the last port has been evaluated, control passes from box 190 to box 162 and the routine continuously repeats.

Figure 5:
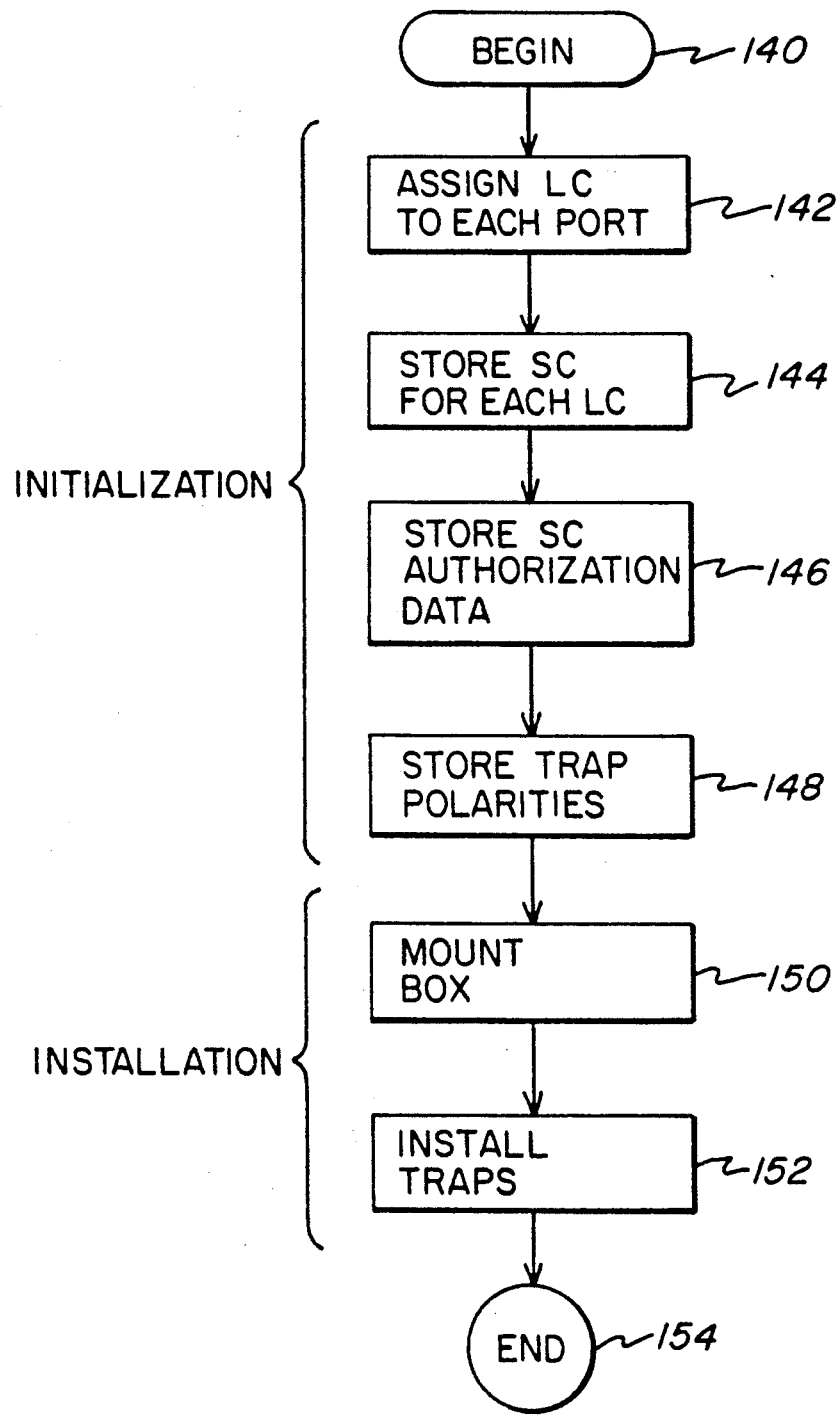
FIG. 5 is a flow chart illustrating an initialization/installation routine for a distribution device in accordance with the present invention.

The flow chart of FIG. 5 illustrates an initialization/installation routine for the addressable module. Initialization of the module (boxes 142-148 of FIG. 5) may be done during manufacture, subsequently at the facilities of the cable system operator, or by a technician in the field using a portable terminal. Physical installation of the module on a subscriber's home and installation of traps is carried out by a cable television system installer, although the traps can alternately be installed at the system operator's premises. The routine begins at box 140, and at box 142 a logical channel number is assigned to each port. Although initial logical channel number to port assignments are made at installation, it should be appreciated that these assignments can later be changed from the cable system headend by downloading new assignment data over the FM data path.

At box 144, a service code is stored for each logical channel. Initialization can be effected by data downloaded at the factory, at the system operator's facilities, in the field by data downloaded from the headend, or by the installer using a portable computer to load the initialization data into the addressable module.

Once the addressable module is installed, the service code to logical channel information may be globally transmitted periodically if the service codes for a port are changing, as they would be for pay-per-view services. Otherwise, the data loaded at initialization would remain constant, and there would be no requirement for the headend to transmit this information in the FM data stream.

Service code authorization data is downloaded as indicated at box 146. This data can initially be set during manufacture of the module, subsequently by the system operator or installer, or it may be downloaded by the headend in the form of an authorization map as well known in the art. The authorization map is addressed to the specific addressable module serving a subscriber, and identifies the service codes for premium program signals or other cable services that the subscriber is entitled to receive. This data may be downloaded by the headend at any time both during and/or after installation, and is changed each time a subscriber adds or deletes services to his account.

At box 148, the polarity of each trap installed at a port is identified. Again, this initialization data can be loaded during manufacture, but more typically it is loaded by the system operator or technician/installer who actually installs the traps. At this point, the box is fully initialized, and the installer mounts the physical addressable module box to the subscriber premises, as indicated at box 150. Typically, the addressable module is mounted to an outside wall of the subscriber's residence. At box 152, fixed frequency traps are installed at each of the addressable module ports. In a preferred embodiment, four ports are provided to enable up to four premium services to be provided to the subscriber. Each premium service is transmitted by the local cable system operator on a particular channel, and each installed trap will correspond to a different one of the channel frequencies. The installation routine of FIG. 5 ends at box 154.

The authorization map in the addressable module is equivalent to that used in the Impulse 7000 Series converter/descramblers previously mentioned. In a preferred embodiment, 256 service codes are supported in the addressable module. Using a common service code format for existing converter/descramblers and the addressable module of the present invention simplifies the integration of addressable modules into existing systems.

Like the authorization map, the service code to logical channel data may be transmitted by the headend in the form of a map. In a cable television system that only offers services on a monthly subscription basis, this map does not vary with time and only needs to be loaded into the addressable module when it is configured for the particular cable system. In a system that offers dynamic events, such as pay-per-view services (e.g., special sports events, concerts, first-run movies, etc.), the service code to logical channel map contents vary with time as events start and finish. In this case, the map must be periodically transmitted to the addressable module, and is interspersed between the addressing data and other data transmitted on the FM path. The service code to logical channel map is transmitted globally to all addressable modules.

The data assigning logical channel numbers to ports may be in a map format, in which the map has an entry for each physical port on the addressable module. Also included in each entry is the trap polarity information for each port. This map is downloaded any time the physical traps on the addressable module are changed. Typically, this only occurs at initial installation. However, a new map may be loaded into an addressable module on an individual basis in cases where there are more controlled channels than ports on the addressable module, and logical channel numbers must be reassigned to provide for changes in services ordered by a subscriber.

Figure 4:
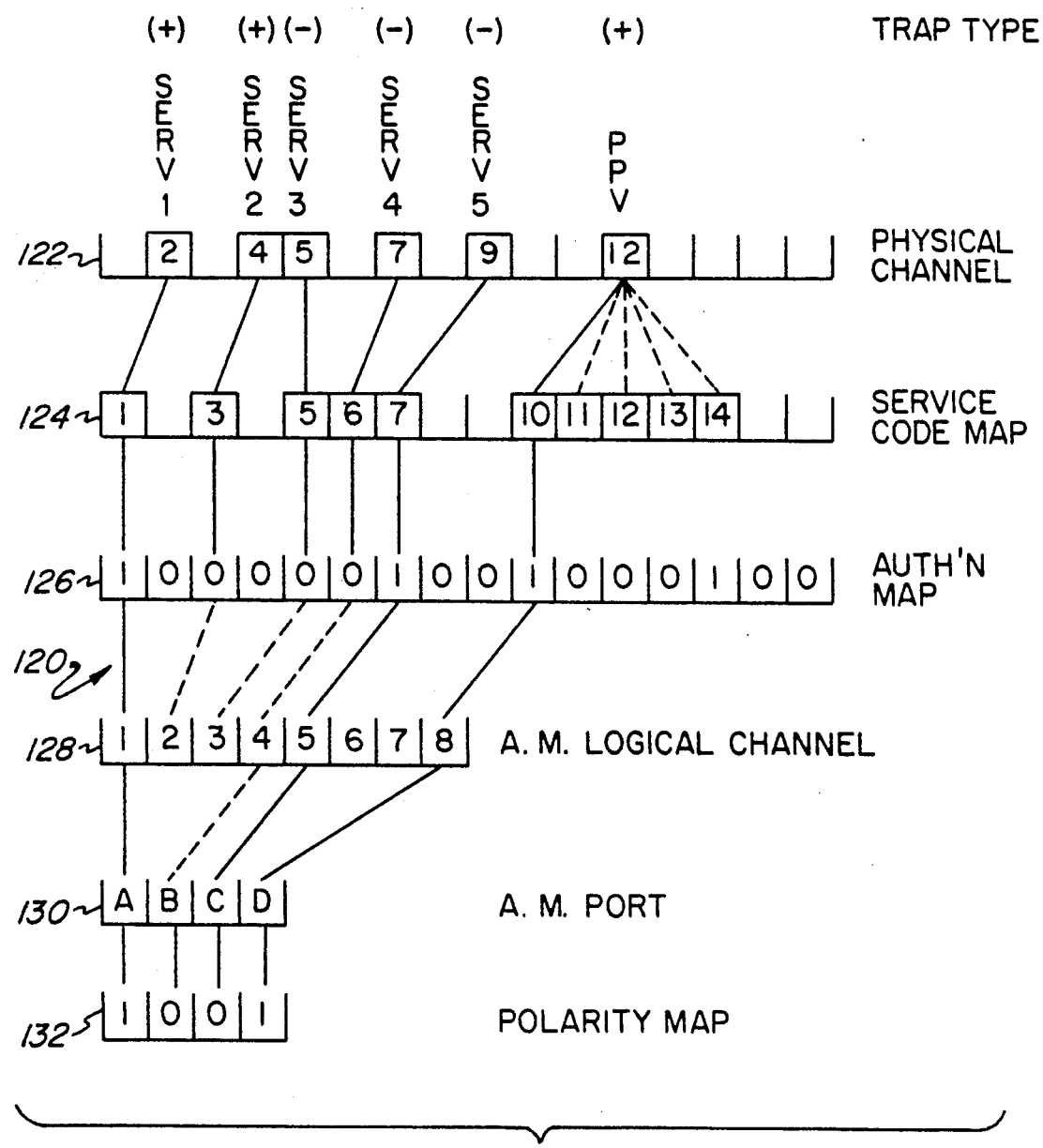
FIG. 4 is a logic flow diagram illustrating the authorization of ports to provide access to signals in accordance with the present invention.

An example of an authorization logic flow, generally designated 120, is illustrated in FIG. 4. This figure shows the linkages between system elements, indicating how physical channels, service codes, and logical channels are related to provide maximum operational flexibility. Six pay services (SERV 1, SERV 2, SERV 3, SERV 4, SERV 5, and PPV) are illustrated, one of which is a pay-per-view service. The pay channels are on arbitrary physical channels 2, 4, 5, 7, 9 and 12 as illustrated at 122. Each premium service is transmitted along the cable distribution system either in the clear or with an interfering carrier, requiring the use of a negative (transmitted clear) or positive (interfering carrier) trap type as illustrated. In particular, access to the premium services on channels 2, 4, and 12 will require the use of a positive trap. Denial of premium services on channels 5, 7 and 9 will require the use of negative traps.

Each of the physical channels is assigned a service code in the service code map 124 contained in the headend computer. Any service code assigned to a physical channel may be changed if a different service is being provided on the channel. For example, as shown in FIG. 4, the service code for channel 12 (pay-per-view services) changes from service code 10 to 11 to 12 to 13 and then to 14 as five different movies are shown. At any instant in time, however, each channel can have only one service code.

An authorization map, indicated at 126, is transmitted to and stored in the addressable module indicating which service codes are authorized for the subscriber. If a service code is authorized, the premium service corresponding to the service code will be accessible to the subscriber. Conversely, services identified by nonauthorized service codes will be denied to the subscriber. Authorized service codes are indicated by a "1" in the service code map. Nonauthorized service codes are represented by a "0".

The service codes are mapped to addressable module ("A.M.") logical channels as indicated at 128. The logical channel assignments are arbitrary numbers. A logical channel number could be assigned as the actual physical channel number, but does not have to be. As indicated in FIG. 4, service codes 1, 7, 10 and 14 are authorized for the subscriber using this addressable module (service code 14 is not active at the point in time illustrated in FIG. 4). Service code 1 corresponds to premium service "SERV 1", service code 7 corresponds to premium service "SERV 5", and service codes 10 and 14 correspond to individual programs (e.g., movies) on the pay-per-view service "PPV". Service codes 3, 5, and 6 are not authorized, as indicated by the dashed lines.

The addressable module stores the service code to logical channel information for the logical channels that were assigned to its ports at initialization. This information is constantly updated to the extent new service code to logical channel assignment data are downloaded from the headend. In the example of FIG. 4, service code 1 has been assigned to logical channel 1. Service code 7 has been assigned to logical channel 5, and service code 10 has been assigned to logical channel 8. In addition, nonauthorized service codes 3, 5, and 6 have been assigned to logical channels 2, 3, and 4, respectively.

The addressable module of FIG. 4 contains four ports A, B, C and D as indicated at 130. Logical channel 1 has been assigned to port A, logical channel 4 has been assigned to port B, logical channel 5 has been assigned to port C, and logical channel 8 has been assigned to port D. Since only four ports are provided, the addressable module can control only up to four channels. This illustrates the limitation imposed on the system operator that results from configuring the system with more premium channels than there are ports available on the addressable module. The subscriber served by the addressable module will have only four channels that can be remotely controlled by the system operator.

It will be appreciated that where addressable control of a greater number of channels is required, additional ports must be provided in the addressable module. Since the port to logical channel map can be different from one addressable module to another, depending on the frequencies of the physical traps installed in the addressable module, different combinations of four channels can be provided to different subscribers within the same system. The function of the port to logical channel map is to relate the logical channels to the four available ports. It is this feature that permits a system wide data stream to control access to cable television programming regardless of the difference in physical channel assignments and the difference in filter port locations among local cable systems and individual subscribers.

A polarity map, which determines the configuration of the ports based on the trap type (i.e., negative or positive) is stored in the addressable module as indicated at 132. As can be seen, port A provides access to premium service "SERV 1" via a positive trap. Accordingly, a "1" is stored in the polarity map for port A. Similarly, port B corresponds to "SERV 4" which requires a negative trap for service denial, and a "0" is therefore stored in the polarity map for port B. Port C relates to "SERV 5", requiring a negative trap for service denial with a corresponding "0" stored in the polarity map. Finally, port D relates to the pay-per-view service requiring a positive trap for service access, and a corresponding "1" is stored in the polarity map for port D. The trap for each port will have a frequency corresponding to that of the physical channel on which the associated premium service is located.

The addressable module continually evaluates each port to determine the correct switch state to set. In the example of FIG. 4, port A is evaluated and determined to be assigned service code 1. By consulting the authorization map, service code 1 is determined to be authorized. The polarity map instructs the addressable module to authorize this service by switching the port to the trapped path, because the channel is authorized via a positive trap.

Port B is evaluated next, and determined to be assigned to service code 6. By consulting the authorization map, it is determined that service code 6 is not authorized. The polarity map instructs the addressable module to deauthorize this service by switching the port to the trapped path, because the channel is denied via a negative trap.

Port C is then evaluated and determined to be authorized, requiring that the switch be configured to bypass the negative trap. Then, port D is evaluated and determined to be authorized, requiring that the switch be configured to connect the positive trap.

It is noted that when the service code for the pay-per-view ("PPV") service changes to 11, the addressable module will no longer be authorized. This is evident, since the bit in the authorization map corresponding to service code 11 is not set.

It should now be appreciated that the present invention provides an apparatus and method for supplying or denying subscriber access to premium programs. An addressable module controls signal distribution to individual subscribers by switching fixed frequency filters into or out of series connection with a subscriber's cable feed. There is no need to initialize each addressable module with physical filter frequency information or fixed service code information. Instead, the novel system architecture of the present invention uses a logical channel construct. This permits a multiple system operator to use a system wide data stream to control access to cable television programming regardless of the difference in physical channel assignments and the difference in filter port locations among local cable systems and individual cable subscribers. The system architecture also allows the number of pay services offered system wide to be greater than the number of filter ports available on the addressable modules.

The assignment of logical channels to physical filter ports, and the provision of specific trap frequencies for the ports is made at the time of initialization and installation of the addressable module. Thereafter, premium programming distribution control is accomplished without the need to account for or keep track of differences in channel frequencies, filter frequencies, or filter port locations.

Although the invention has been described in connection with a preferred embodiment, those skilled in the art will appreciate that numerous adaptations and modifications may be made thereto without departing from the spirit and scope of the invention, as set forth in the following claims.

What is claimed is:

1. Cable television apparatus for supplying or denying subscriber access to cable services comprising:
   a signal path for carrying cable service signals to an addressable subscriber module;
   an access device contained in said subscriber module and coupled to selectively provide access to signals of a particular frequency carried on said signal path;
   means operatively associated with said subscriber module for associating said access device with a logical channel designation;
   means operatively associated with said subscriber module for receiving and storing a first service code for association with said logical channel;
   means responsive to a communication addressed to said subscriber module for receiving and storing a set of authorized service codes for the module;
   means for retrieving and comparing the stored first service code to the stored authorized service codes; and
   means responsive to said comparing means for actuating said access device to provide access to a signal carried at said particular frequency if the first service code is an authorized service code.

2. Apparatus in accordance with claim 1 wherein said addressable subscriber module comprises a plurality of access devices identified by different logical channel designations, wherein each access device is actuable to provide or deny access to a signal of a particular frequency in response to determinations made by said comparing means based on service codes associated with the logical channel designations for the access devices.

3. Apparatus in accordance with claim 2 wherein said access devices comprise switchable ports coupled in series along the signal path.

4. Apparatus in accordance with claim 3 wherein said ports each comprise:
   means responsive to said actuating means for coupling a trap to the signal path;
   means responsive to said actuating means for alternately bypassing said trap; and
   means responsive to a disconnect signal for alternately opening said signal path to prevent the transmission of program signals thereon.

5. Apparatus in accordance with claim 1 wherein said access device comprises:
   means responsive to said actuating means for coupling a trap to the signal path;
   means responsive to said actuating means for alternately bypassing said trap; and
   means responsive to a disconnect signal for alternately opening said signal path to prevent the transmission of program signals thereon.

6. Apparatus in accordance with claim 5 further comprising:
   means operatively associated with said subscriber module for storing data indicative of the polarity of said trap, wherein said actuating means is responsive to the polarity data and the comparing means to couple or decouple the trap from said signal path.

7. Apparatus in accordance with claim 1 wherein said means for receiving and storing authorized service codes periodically receives and stores updated sets of authorized service codes.

8. Apparatus in accordance with claim 7 wherein said means for receiving and storing said first service code periodically receives and stores new service codes for association with said logical channel.

9. Apparatus in accordance with claim 1 wherein said associating means comprises a memory for receiving and storing the logical channel designation, whereby said logical channel designation can be remotely changed.

10. Addressable apparatus for switching traps in and out of a cable television subscriber drop in response to data received from a headend, comprising:
    an addressable subscriber module for receiving cable service signals from a headend and selectively outputting the signals to a subscriber via a signal path;
    a computer processor operatively associated with said addressable subscriber module and coupled to receive and store a set of authorized service codes for the subscriber module transmitted from said headend;
    means responsive to said computer processor for selectively coupling a trap to said signal path; and
    means operatively associated with said computer processor for storing a logical channel designation for said trap and a service code for association with said logical channel designation;
    wherein said computer processor actuates said trap coupling means to couple or decouple said trap depending on whether the service code associated with said logical channel designation is one contained in the set of authorized service codes for the subscriber module.

11. Apparatus according to claim 10 wherein said trap coupling means comprises:
    means responsive to said computer processor for coupling a trap in series with said signal path;
    means responsive to said computer processor for alternately bypassing said trap along said signal path; and
    means responsive to a disconnect signal from said headend for alternately opening said signal path to prevent the transmission of program signals thereon.

12. Apparatus according to claim 11 wherein said trap coupling means comprises a solid-state double pole throw switch with a separate off position.

13. Apparatus according to claim 10 wherein said trap can comprise either a positive or negative trap, said apparatus further comprising:
    memory means for storing data indicative of the polarity of said trap, and wherein said computer processor is responsive to the polarity data to couple or decouple said trap from said signal path.

14. Apparatus according to claim 10 further comprising means for receiving a new service code from said headend for association with said logical channel designation.

15. Apparatus according to claim 10 wherein said set of authorized service codes is addressed specifically to said subscriber module.

16. Apparatus according to claim 10 comprising a plurality of RF traps associated with said subscriber module, each trap configured to provide or deny access to cable service signals carried on a different cable television channel when the trap is coupled to said signal path.

17. A cable television signal distribution system or the like providing remote authorization of subscriber access to signals, comprising:
a headend;
means for coupling said headend to transmit signals on a signal distribution line;
a subscriber drop coupled to receive signals from said distribution line; and
signal authorization apparatus, coupled in series with said subscriber drop, including:
a computer processor;
an access device responsive to said computer processor for selectively providing access to signals of a particular frequency carried on said subscriber drop;
means operatively associated with said computer processor for associating said access device with a logical channel designation;
means coupled to said computer processor for receiving data from said headend identifying a service code to be associated with said logical channel designation and identifying an authorized service code;
means operatively associated with said computer processor for comparing the service code associated with said logical channel designation to the authorized service code; and
means responsive to said comparing means for actuating said access device to provide or deny access to a signal, depending on whether the service code associated with the logical channel designation is an authorized service code.

18. A system in accordance with claim 17 wherein:
said signal authorization apparatus comprises a plurality of access devices, each associated with a different logical channel designation;
said headend transmits data associating a different service code with each logical channel designation and identifying a set of authorized service codes for the signal authorization apparatus;
said comparing means compares the service code associated with each logical channel designation to the set of authorized service codes; and
said actuating means actuates each access device to provide or deny access to a particular signal, depending on whether the service code associated with the access device's logical channel designation is an authorized service code.

19. A system in accordance with claim 18 wherein said headend comprises means for changing the transmitted data identifying service code associations and service code authorizations to enable remote modification of the services available to a subscriber.

20. A system in accordance with claim 18 further comprising:
means, coupled to receive a disconnect signal from said headend, for actuating said access devices to open said subscriber drop in response to a disconnect signal.

21. A system in accordance with claim 18 wherein said access devices switch fixed frequency traps in and out of said subscriber drop to provide or deny access to signals at the trap frequencies.

22. A method for providing remote headend control of subscriber access to signals carried on a signal distribution line, comprising the steps of:
receiving signals at a subscriber location from a distribution line;
coupling the received signals to a subscriber access control device;
storing a logical channel designation for said access control device;
storing a service code to be associated with said logical channel designation;
receiving data from said distribution line that is indicative of whether said stored service code is an authorized service code for the subscriber location;
actuating the access device to provide access to a received signal corresponding to the stored service code if the service code is authorized for the subscriber location, and
actuating the access device to deny access to a received signal corresponding to the stored service code if the service code is not authorized for the subscriber location.

23. A method in accordance with claim 22 comprising the further steps of:
periodically receiving new data from said distribution line that is indicative of currently authorized service codes for the subscriber location.

24. A method in accordance with claim 23 comprising the further step of:
periodically receiving and storing updated data from said distribution line indicative of a service code to be associated with said logical channel designation.

25. A method in accordance with claim 22 wherein said coupling step comprises the steps of:
coupling the received signals to a subscriber drop; and
coupling a plurality of access devices, each associated with a different logical channel designation, in series with said subscriber drop;
wherein:
a different code is stored for each logical channel designation,
said data receiving step receives data indicative of which of the service codes are authorized for the subscriber location, and
said actuating steps actuate the access devices to provide access to signals corresponding to authorized service codes and deny access to signals corresponding to nonauthorized service codes.

26. A method in accordance with claim 25 comprising the further step of:
actuating said access devices to open-circuit said subscriber drop in response to a disconnect signal received from said headend via the distribution line.

27. A method in accordance with claim 25 wherein said access devices comprise ports, said method comprising the further step of:

installing a signal trap at each port to be alternately coupled in series with said subscriber drop or by-passed when the corresponding port is actuated to control subscriber access to a received signal.

28. In a cable television system or the like having a headend, a signal distribution path for carrying program signals from the headend to subscribers, and a plurality of subscriber units coupled to the distribution path for providing access to the signals a subscriber is authorized to receive, the improvement comprising:

means at said headend for generating a data table mapping a plurality of service codes corresponding to different services to a plurality of logical channel designations;

means for globally transmitting the data table from the headend to said subscriber units;

means for addressably transmitting service code authorization data from said headend to individual subscriber units;

means operatively associated with said subscriber units for associating an access device at each subscriber unit with a logical channel designation; and means operatively associated with said subscriber units for actuating said access devices to provide or deny a service depending on whether the service code mapped to the logical channel designation associated with the access device is authorized for the subscriber unit.

29. A system in accordance with claim 28 wherein said data table and service code authorization data are transmitted on a common data path.

30. A system in accordance with claim 28 wherein said data table is periodically updated at said headend and continuously retransmitted to said subscriber units.

31. A system in accordance with claim 28 wherein said data table is generated and transmitted only when necessary to effect changes in service code to logical channel designation mappings.

32. A system in accordance with claim 28 wherein each subscriber unit contains a plurality of access devices identified by different logical channel designations.

33. A system in accordance with claim 32 further comprising:

means for periodically downloading data from said headend to individual subscriber units to change the logical channel designations by which particular access devices are identified.

34. A method for remotely authorizing subscriber units in a network from a headend to provide or deny access to specific signals comprising the steps of:

providing an access device at each subscriber unit;

identifying each access device by a logical channel designation stored at the subscriber unit;

globally transmitting a data table from the headend to the subscriber units, said data table mapping a plurality of service codes for different signals to a plurality of logical channel designations;

transmitting data from the headend to individual subscriber units defining authorized service codes for the subscriber unit;

storing the globally and individually transmitted data in the subscriber units;

processing the stored data in each subscriber unit to determine whether the service code mapped to the logical channel designation for the access device is authorized for the subscriber unit; and actuating said access devices to provide or deny a signal to a subscriber depending on the result of said determination.

35. The method of claim 34 wherein said data table and authorized service code data are transmitted on a single data channel.

36. The method of claim 34 wherein said data table is continuously transmitted by the headend.

37. The method of claim 34 wherein said data table is transmitted only by the headend only when necessary to effect changes in service code to logical channel number mappings.

38. A method for providing access to specific signals received from a communication network by a subscriber module comprising the steps of:

periodically receiving a globally transmitted data table from the network at a subscriber module, said data table mapping a plurality of service codes corresponding to different signals to a plurality of logical channel designations;

receiving individually addressed data from the network defining authorized service codes for the subscriber module;

receiving data assigning a logical channel number to an access device contained in the subscriber module; and actuating said access device to provide access to a signal if the service code for the signal is mapped to the logical channel designation assigned to the access device and the service code is authorized.

39. Subscriber apparatus for providing access to specific signals received from a communication network comprising:

first means operatively associated with a computer processor for receiving a globally transmitted data table from a communications network, said data table mapping a plurality of service codes corresponding to different signals to a plurality of logical channel designations;

second means operatively associated with said computer processor for receiving individually addressed data from said network defining authorized service codes;

an access device;

means coupled to said computer processor for storing a logical channel designation for said access device; and means responsive to the computer processor, for actuating said access device to provide access to a signal if the service code for the signal is authorized and mapped to the logical channel designation stored for the access device.

* * * * *